United States Patent
Sieg

[19]

[11] Patent Number: 6,148,668

[45] Date of Patent: Nov. 21, 2000

[54] GAS GRILL TANK SCALE

[75] Inventor: Ewald Sieg, Palatine, Ill.

[73] Assignee: Weber-Stephen Products Co., Palatine, Ill.

[21] Appl. No.: 09/260,839

[22] Filed: Mar. 2, 1999

[51] Int. Cl.[7] ............................ G01F 23/20; A47J 37/00; F24C 3/00; G01G 3/00

[52] U.S. Cl. ........................... 73/296; 177/225; 177/231; 177/234; 177/130; 177/131; 126/39; 126/40; 126/41 R; 126/41 A

[58] Field of Search ................................ 126/41 A, 41 R, 126/40, 39 R; 73/296; 177/225, 130, 131, 231, 234

[56] References Cited

U.S. PATENT DOCUMENTS

| | | |
|---|---|---|
| 411,576 | 9/1889 | Brown . |
| 1,133,850 | 3/1915 | Garraux . |
| 1,224,157 | 5/1917 | Fry . |
| 1,504,102 | 8/1924 | Davis . |
| 1,548,185 | 8/1925 | Carr . |
| 1,954,476 | 4/1934 | Gloekler . |
| 1,964,805 | 7/1934 | Barnes . |
| 2,196,280 | 4/1940 | Thornhill et al. . |
| 2,304,140 | 12/1942 | Bergholm . |
| 2,447,925 | 8/1948 | Vorbusch . |
| 2,541,528 | 2/1951 | McAvoy . |
| 2,740,517 | 4/1956 | Evans . |
| 2,821,854 | 2/1958 | Franke . |
| 2,842,044 | 7/1958 | Kirk . |
| 2,881,695 | 4/1959 | DiPietro . |
| 2,905,077 | 9/1959 | Del Francia . |
| 3,418,921 | 12/1968 | Fautz . |
| 3,443,510 | 5/1969 | Norton . |
| 3,474,724 | 10/1969 | Jenn . |
| 3,545,908 | 12/1970 | Lohman . |
| 3,567,065 | 3/1971 | Dinse . |
| 3,859,978 | 1/1975 | Smith . |
| 3,989,028 | 11/1976 | Berger . |
| 4,233,890 | 11/1980 | Jansen . |
| 4,245,505 | 1/1981 | Baynes . |
| 4,321,857 | 3/1982 | Best . |
| 4,413,515 | 11/1983 | Quinn . |
| 4,485,972 | 12/1984 | Freber . |
| 4,524,617 | 6/1985 | Krehel et al. ............................. 73/296 |
| 4,677,964 | 7/1987 | Lohmeyer et al. ....................... 73/296 |
| 5,056,364 | 10/1991 | Kahler et al. . |
| 5,186,159 | 2/1993 | Crow, Jr. et al. . |
| 5,686,704 | 11/1997 | Simser .................................... 177/167 |

FOREIGN PATENT DOCUMENTS

| | | |
|---|---|---|
| 0 336 451 B1 | 1/1993 | European Pat. Off. . |
| 688230 | 2/1940 | Germany . |
| 16819 | 2/1981 | Japan . |
| 143701 | 6/1920 | United Kingdom . |

OTHER PUBLICATIONS

"Sunbeam Grillmaster Gas Barbecue Appliance," Catalog, Models 9490, 9480, Neosho Products Division, p. 2, 1979.

*Primary Examiner*—Hezron Williams
*Assistant Examiner*—Dennis Loo
*Attorney, Agent, or Firm*—Wallenstein & Wagner, Ltd.

[57] ABSTRACT

An apparatus for indicating the amount of fuel in a fuel tank for a barbecue grill is disclosed. The apparatus includes a first housing member having indicator marks on an indicator wall thereof, a second housing member slidably engaging the first housing member and further securing the fuel tank, and a spring member connected to the first and second housing members to provide a resistive force to oppose the downward movement force of the fuel tank. The second housing member has a gauge wall with openings such that the gauge wall at least partially overlies the indicator wall of the first housing member to progressively expose indicator marks through the openings. The exposed indicator marks provide a readout of the amount of fuel remaining in the fuel tank.

36 Claims, 4 Drawing Sheets

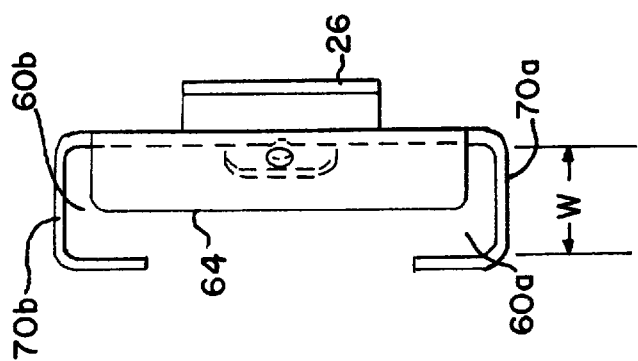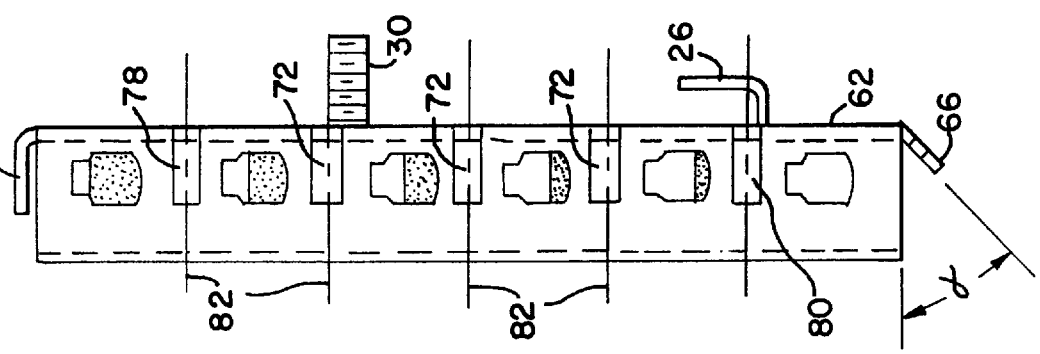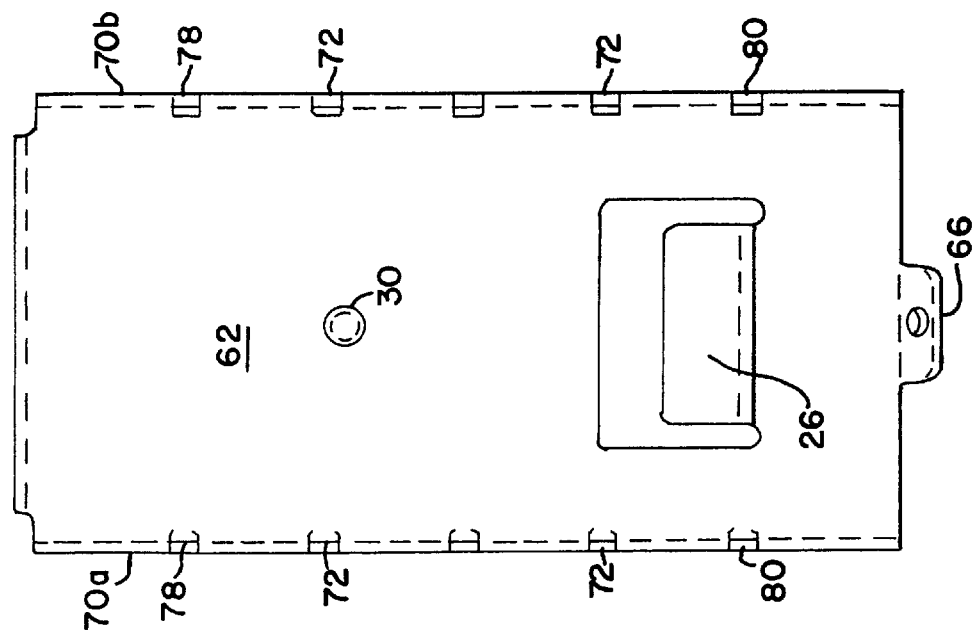

GAS GRILL TANK SCALE

TECHNICAL FIELD

The present invention relates generally to gas grills and, more particularly, to portable gas grills having a fuel tank and a fuel indicator device for indicating the amount of fuel remaining in the fuel tank.

BACKGROUND OF THE INVENTION

Gas grills have become very popular as outdoor portable cooking devices. Portable gas grills generally consist of a cooking chamber supported by a support frame having wheels. The cooking chamber generally consists of gas burners in the lower portion of the chamber and a cooking grid spaced a distance above the gas burners for supporting the food to be cooked. A fuel tank containing a liquid fuel, such as liquid propane, is mounted to the support frame and a gas regulator hose assembly connects the fuel tank to the gas burners. When the fuel tank becomes emptied, it must be removed from its mounting and replaced with a full fuel tank.

Because it is not desirable to have the fuel run out during use of the barbecue grill, a tank scale measuring the amount of fuel remaining in the fuel tank is employed. Prior attempts to provide a measurement device for measuring the amount of fuel remaining in a fuel tank generally fall within one of two categories: (1) platform style scales (i.e., those which are designed to have the fuel tank rest on a spring loaded platform), and (2) indicator arm style scales (i.e., those where the fuel tank is hung from the scale and a spring loaded indicator arm protrudes from the scale to point to a fuel indication gauge). However, both platform style scales and indicator arm style scales have several drawbacks including their complexity, bulkiness and the fact that they are specially designed for use with a specific grill having a specific frame structure.

1. Platform Style Scales:

U.S. Pat. No. 4,245,505 discloses a tank scale wherein a LP tank is placed on a spring-loaded platform. A pointer made of several linkages in the pedestal of the grill frame is linked to the platform and moves when the platform moves, thus indicating the amount of fuel in the tank on a display in a panel of the grill.

Similarly, U.S. Pat. No. 5,186,159 discloses a tank scale wherein a fuel tank is positioned on and clamped to a clamping ring style platform. Dependent on the relative weight or content of the amount of fuel contained in the tank, a spring loaded lever contacting the fuel tank moves up and down. The lever is adapted to move a flexible indicator member which has a horizontal marker or indicia and acts to indicate the relative position of the indicator when compared to a stationary indicia imprinted on a cover plate of the grill base.

2. Indicator Arm Style Scales:

U.S. Pat. No. 4,413,515 discloses a fuel level gauge employing a gauge member type indicator arm. One end of the gauge member is connected to the top of the fuel tank, and the other end of the gauge member passes through an opening in the leg of the grill and protrudes out the opposite side of the leg. The fuel level in the tank is indicated by the amount of the gauge member protruding through the opening in the leg.

U.S. Pat. No. 4,677,964 (commonly assigned) discloses a tank scale wherein a first element is connected to a cross member of the frame and the second element is connected to the tank. An indicator arm is connected to the first element and is pivoted by movement of the second element relative to the first member. Thus, as the weight of the tank moves the second element, the indicator arm changes angles. The indicator arm works in conjunction with a scale on a leg of the cart, thus indicating the amount of fuel remaining within the tank by pointing to the scale.

Finally, U.S. Pat. No. 5,056,364 discloses an indicator arm style fuel gauge for cart-mounted fuel tanks wherein one bracket is secured to the cart and another bracket is secured to the fuel tank. An indicator rod extending from the cart bracket indicates the attitude of the tank relative to a fixed reference point on the control panel of the grill, thereby indicating the amount of fuel left in the tank.

Accordingly, a tank scale in accordance with the present invention provides a small, inexpensive, and universal tank scale which eliminates the drawbacks of the prior tank scales described above.

SUMMARY OF THE INVENTION

The tank scale of the present invention is adapted to be utilized in conjunction with a gas grill and includes a first member, a second member slidably engaging the first member, and a spring member connected to the first and second members. In the preferred embodiment, the first and second members act as housing members of the device. One of the first or second members has an indicator wall with indicator marks thereon, and the other of the first or second members has a gauge wall with a plurality of openings. The gauge wall at least partially overlies the indicator wall such that a portion of the indicator wall is exposed through the openings in the gauge wall. A fuel tank is secured to one of the members. The weight of the fuel tank provides a force for moving the housing member that the fuel tank is secured to. The spring member connected to the housing members provides a resistive force to oppose downward sliding movement of the housing member connected to the fuel tank. Thus, through relative movement of the housing members based on the opposed forces (i.e., the weight of the fuel tank and the resistive force of the spring member), the indicator marks are sequentially exposed through the openings in the gauge wall, thereby registering the amount of fuel left in the fuel tank.

According to one aspect of the present invention, the first housing member is adapted to remain fixed in position by being affixed to the frame of the barbecue grill, and the second housing member is adapted to be movable relative to the first housing member. A fuel tank having a weight dependent on the amount of fuel remaining in the tank is removably secured to the second housing member. The fuel tank is secured to the second housing member by a mounting bracket on the second housing member. The weight of the fuel tank provides an opposed movement force for moving the second housing member relative to the first housing member. Specifically, the weight of the fuel tank tends to slide the second housing downward with respect to the first housing member. In opposition to the force provided by the weight of the tank, the spring member which connects the first and second housing members provides a resistive force to oppose any downward sliding movement between the first and second housing members.

According to another aspect of the present invention, the first housing member has an indicator wall with indicator marks thereon. Additionally, the second housing member has a gauge wall, wherein the gauge wall has a plurality of openings through the wall. The gauge wall partially overlies the indicator wall such that at least one of the openings in the gauge wall exposes an underlying area of the indicator wall, and specifically exposes an indicator mark.

According to another aspect of the present invention, the indicator marks on the indicator wall are arranged to be exposed through the openings in the gauge wall in a progressive fashion. In this manner, as the movable housing member slides downward and upward with respect to the fixed housing member, due to the changing weight of the fuel tank, different indicator marks are exposed through different openings in the gauge wall. And, the different openings in the gauge wall correspond to different levels of fuel in the tank, thereby providing a registration of the amount of fuel left in the fuel tank. By exposing the indicator marks through the gauge wall in a progressive fashion, as the fuel is emptied from the fuel tank, the fuel gauge will provide readouts of full, empty, and partially empty. Thus, when a full fuel tank is secured to the movable housing member, a proximal indicator mark is exposed though an opening in the gauge wall, and when an empty fuel tank is secured to the movable housing member, a distal indicator mark is exposed through a different opening in the gauge wall.

According to another aspect of the present invention, each of the indicator marks and each of the openings have a centerline. Generally, the centerline of each indicator mark is spaced an equal distance apart. Similarly, the centerline of each opening is generally spaced an equal distance apart. However, the distance between the centerlines of the indicator marks and the distance between the centerlines of the openings is not equal. This allows sequential indicator marks to be progressively exposed through different openings, thereby providing a progressive readout of the weight of the fuel tank. Specifically, applying a stroke readout multiplier factor of 5:1, a ¾" stroke (i.e., the working range of the scale), and a 3¾" range of visible readout provide for varying sequential indications as to the volume of gas remaining in the tank scale. In another embodiment, however, either the centerlines of the indicator marks or the centerlines of the openings are unevenly spaced, and the other centerlines are evenly spaced. In this manner a progressive readout of the weight of the fuel tank is also obtained.

According to yet another aspect of the present invention, the tank scale includes a first shaft, a second shaft, and a plurality of rollers. Generally, the first and second shafts are connected to the housing member which is fixed to the barbecue grill frame. A roller is placed on the end of each shaft. The rollers are partially encapsulated by a portion of the movable housing member, and provide a bearing or rolling surface whereby the movable housing member can slide upward and downward with respect to the fixed housing member. Additionally, the movable housing member has a stop adjacent a top of the movable housing member. The stop prevents the movable housing member from becoming detached from the fixed housing member when the fuel tank is full of fuel.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 4b is a side elevation view of the housing member of FIG. 4a;

FIG. 4c is a top plan view of the housing member of FIG. 4a;

FIG. 5a is a front elevation view of another one of the housing members of the tank scale of FIG. 1;

FIG. 5b is a side elevation view of the housing member of FIG. 5a;

FIG. 5c is a top plan view of the housing member of FIG. 5a;

DETAILED DESCRIPTION OF THE PREFERRED EMBODIMENT

Figure 1:
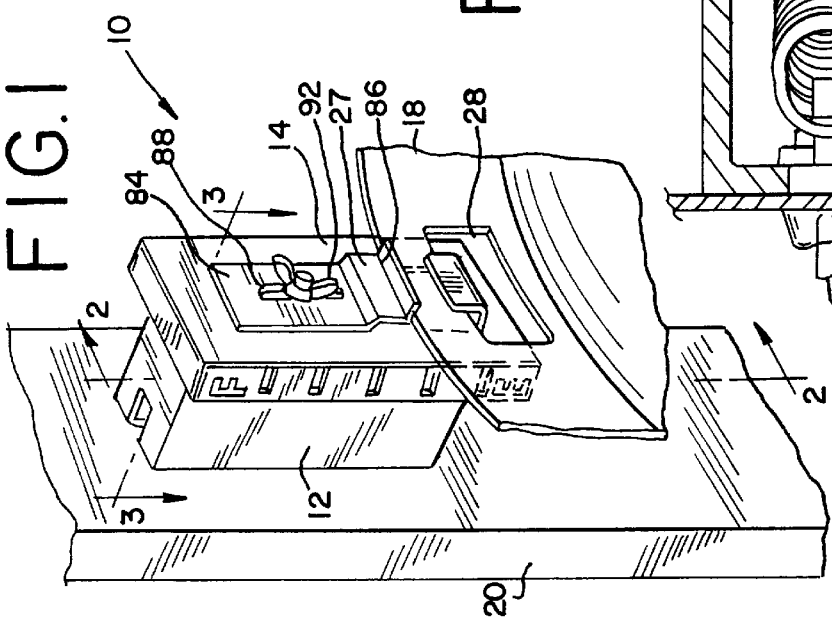
FIG. 1 is a fragmentary perspective view of a tank scale of the present invention.
Figure 2:
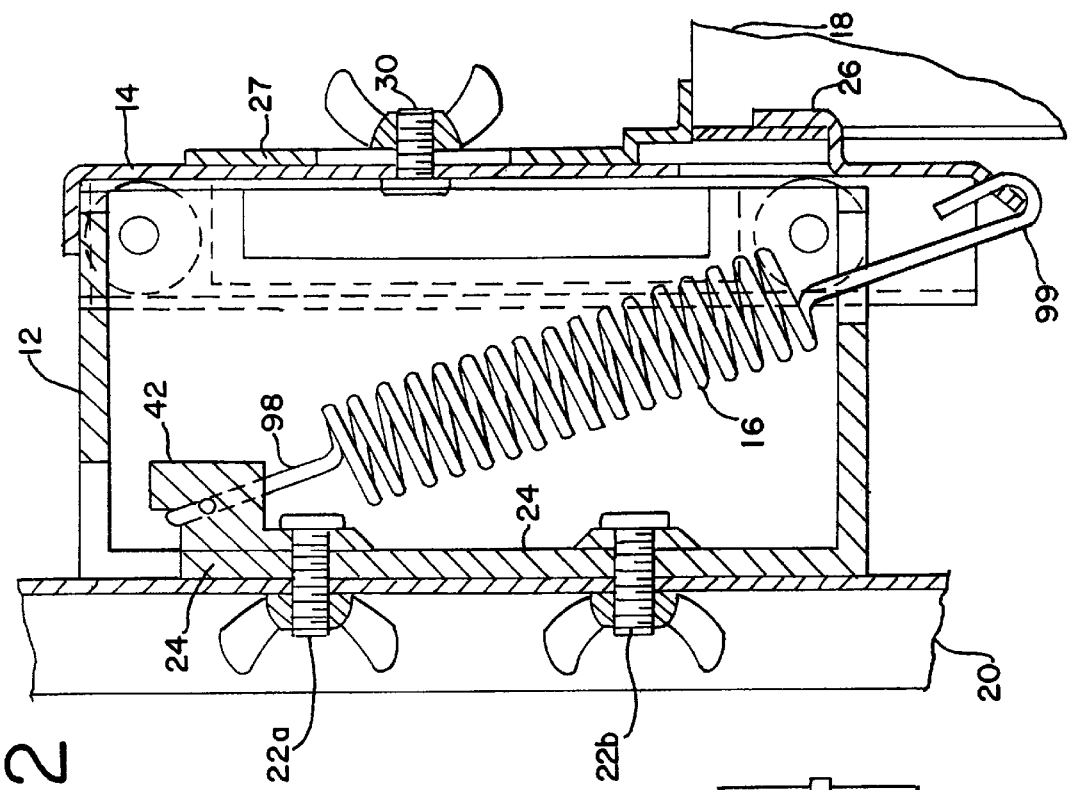
FIG. 2 is a cross-sectional view taken along line 2—2 of FIG. 1.
Figure 3:
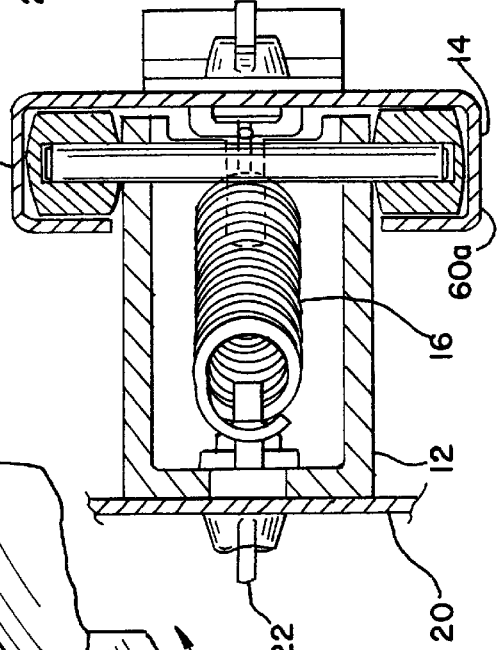
FIG. 3 is a cross-sectional view taken along line 3—3 of FIG. 1.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiment illustrated. The Overall Tank Scale 10:

Referring now in detail to the Figures and initially to FIGS. 1–3, there is shown a preferred embodiment of a tank scale 10 for a gas barbecue grill constructed in accordance with the present invention. The tank scale 10 is generally comprised of three main components, a first scale member, a second scale member, and a spring member 16. In the preferred embodiment as shown in the Figures, the first scale member comprises a first housing member 12, and the second scale member comprises a second housing member 14. However, it is contemplated that the first and second scale members 12,14 having the structure as described and shown herein, may be embodied within a housing structure of the grill, while still practicing the present invention. Through cooperation of the three main components and the additional components of the tank scale 10, it is observed that numerous operations can be accomplished, two specific operations including: (1) supporting a fuel tank 18 for the barbecue grill, and (2) indicating the amount of fuel remaining in the fuel tank 18.

The first housing member 12 is adapted to remain fixed in position by being secured to the frame of the barbecue grill. However, because the tank scale 10 of the present invention is self contained (i.e., there are no components of the tank scale 10 which rely on or work in conjunction with other parts of the barbecue grill to indicate the amount of fuel remaining in the fuel tank 18), the tank scale 10 can be mounted to any gas barbecue grill, irrespective of the configuration of the specific grill, and still provide a readout indicating the amount of fuel remaining in the fuel tank 18. Additionally, the tank scale 10 of the present invention can be mounted to structures other than a grill frame. Generally, however, the tank scale 10 is secured to a centrally located frame member 20 between a pair of legs of the grill frame such that the weight of the grill frame or cart is balanced front to back. In a preferred embodiment of the tank scale 10, the means 22 for securing the tank scale 10 to the grill frame includes two threaded studs 22a,22b extending from a rear wall 24 of the first housing member 12. The threaded studs 22a,22b protrude through the frame member 20, and allow the tank scale 10 to be locked in place with wing nuts. As an alternative embodiment, a portion of the grill frame or body may act as the first housing member 12, with the second housing member 14 being mounted within that portion of the frame or body. For example, a portion of the grill cart may be defined as a scale member by having openings therein, such as is explained below under the heading of Alternative Embodiments.

As shown in FIGS. 1–3, the second housing member 14 slidably engages the first housing member 12. As such, the second housing member 14 is adapted to be movable relative to the first housing member 12. The first housing member 12 has a means 22 to secure the tank scale 10 to the barbecue grill, and specifically to the tank support panel of the barbecue grill. And, the second housing member 14 has a means 26 for supportably securing the fuel tank 18 to the tank scale 10. In a preferred embodiment, the means 26 for supportably securing the fuel tank 18 to the tank scale 10 includes an outwardly extending mounting bracket 26 that is deformed from the second housing member 14. The mounting bracket 26 is adapted to be received into a slot 28 formed along the upper edge of the collar or rim of a standard fuel tank 18. A load bracket or slidable clamp element 27 is held onto the second housing member 14 by a wing nut received on a threaded stud 30 of the second housing member 14. Thus, the tank 18 can be inserted over the mounting bracket 26 and rest on the mounting bracket 26, and the load bracket 27 can then be used to secure the tank 18 to the second housing member 14 for movement therewith. The weight of the fuel tank 18 provides a downward or opposed movement force for slidably moving the second housing member 14 with respect to the first housing member 12. It should be appreciated that the fuel tank 18 has a weight which decreases as fuel is expelled from the tank 18 during use of the barbecue grill. As such, the downward movement force provided by the fuel tank 18 on the second housing member 14 varies.

A spring member 16 connects the first housing member 12 and second housing member 14. As shown in FIGS. 1 and 2, the spring member 16 provides a resistive force to oppose sliding movement of the second housing member 14 with respect to the first housing member 12, due to the weight of the fuel tank 18 connected to the second housing member 14. By proper selection of the spring characteristics of the spring member 16, the tank scale 10 of the present invention will give a fairly accurate indication of the amount of fuel within a standard-sized portable fuel tank 18 connected to the tank scale 10.

Figure 4C:
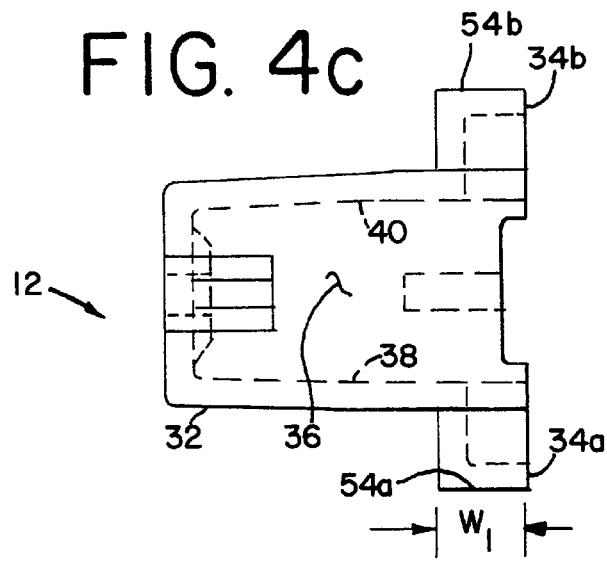
Figure 4A:
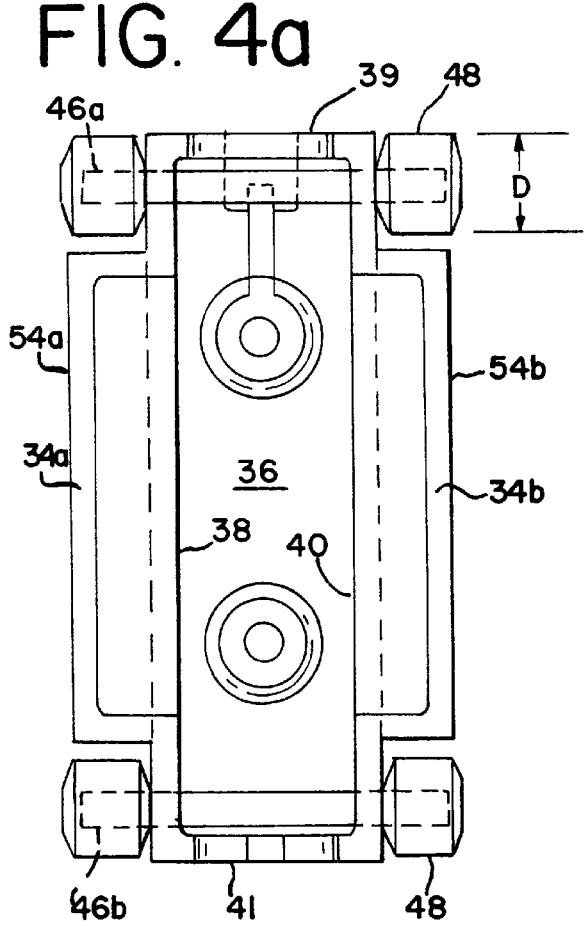
FIG. 4a is a front elevation view of one of the housing members of the tank scale of FIG. 1.
Figure 4B:
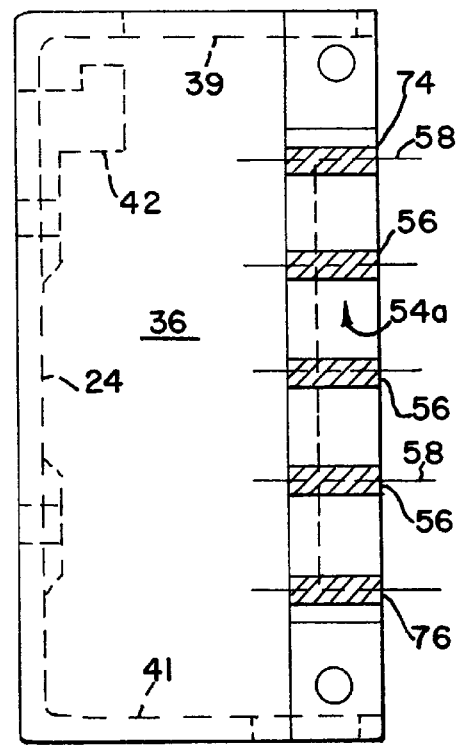

The First Housing Member 12:

The first housing member 12 is shown in more detail in FIGS. 4a–4c. As illustrated in FIGS. 4a–4c, the first housing member 12 includes a main body portion 32, two flared-out indicator projections 34a,34b, and a central cavity 36. The main body portion 32 is comprised of a rear wall 24, a first side wall 38, a second side wall 40, a top wall 39, a bottom wall 41, and a spring member connecting means 42. In a preferred embodiment the first housing member 12 is made of a hard plastic, however, any other material, including metal is viable. Additionally, the preferred embodiment of the first housing member 12 is manufactured out of multiple components: the main body portion 32 including the rear wall 24, side walls 38,40, top and bottom walls 39, 41, central cavity 36 and spring member connecting means 42, is molded or machined out of a single piece of material, and the indicator projections 34a,34b are separate components which are adhered to or imprinted on the main body portion. However, the first housing member 12 could be a single component which is machined out of a single piece of raw material, injection molded, cast, or even bent up and formed. Two threaded studs 22a,22b extend from the rear wall 24 to fixedly connect the first housing member 12 to the tank scale support panel of the grill frame. The threaded studs 22a,22b can be removable components such as bolts which are removable from the first housing member 12, or they can be components which are permanently affixed to the first housing member 12. When the tank scale 10 is connected to the barbecue grill the rear wall 24 of the first housing member 12 abuts the grill frame member 20.

Similar to the threaded studs 22a,22b for fixing the tank scale 10 to the grill frame 20, the spring member connecting means 42 also extends from the rear wall 24 of the first housing member 12. The spring member connecting means 42, however, extends in the opposite direction, i.e., into the cavity 36. Alternatively, the spring member connecting means 42 could extend from either of the side walls 38,40 or the top wall 39 of the first housing member 12 and into the cavity 36. The spring member connecting means 42 is a finger-like projection on which a first end of the spring member 16 is mounted to attach the first housing member 12 to the spring member 16. After such mounting, one end of the spring member 16 is held in a fixed position.

A pair of shafts 46a,46b extend through the side walls 38,40 of the first housing member 12. Both shafts 46a,46b are pressed into place by passing the shafts 46a,46b through pre-drilled thru-holes in the respective side walls 38,40. When in place, the two respective ends of each shaft 46a,46b protrude outside the cavity 36 and past the respective first and second side walls 38,40 of the first housing member 12. The first shaft 46a is located near the top of the first housing member 12, and above the flared-out indicator projections 34a,34b. The second shaft 46b is located near the bottom of the first housing member 12, and below the flared-out indicator projections 34a,34b. Generally, the shafts 46a,46b are made of steel, however any other metal (i.e., aluminum) or non-metal (i.e., plastic) is suitable. Each of the shafts 46a,46b have a roller 48 on the respective ends thereof. The rollers 48 have a diameter (D) which is slightly smaller than the interior width (W) of the two channels 60a,60b of the second housing member 14 as shown in FIGS. 3, 5a and 5c. The rollers 48 are generally encapsulated by the channels 60a,60b of the second housing member 14 as seen in FIG. 1 and 3. As such, the rollers 48 provide a rolling or bearing surface to allow the second housing member 14 to slide or traverse up and down with respect to the first housing member 12, in response to the various forces on the second housing member 14. The two shafts 46a,46b with rollers 48 are spaced a distance apart from each other to prevent skewing or torquing of the tank scale 10 in general, and of the second housing member 14 in particular, when a full fuel tank 18 is attached to the second housing member 14. In a preferred embodiment the rollers 48 are made of a hard plastic, however any bearing surface material will suffice.

The flared-out indicator projections 34a,34b extend radially outward from the first and second side walls 38,40 respectively. The indicator projections 34a,34b are located lengthwise between the ends of the shafts 46a,46b, and extend outward from the side walls 38,40 substantially perpendicular to the shafts 46a,46b. The width ($W_1$) of the indicator projections 34a,34b is slightly less than the diameter D of the rollers 48. As such, the indicator projections 34a,34b do not contact the inside of the channels of the second housing member 14. The indicator projections 34a, 34b have outwardly facing indicator walls 54a,54b, respectively. At least one of the indicator walls 54a,54b have indicator marks 56 thereon, and preferably both indicator walls 54a,54b have indicator marks 56 thereon. The indicator marks 56 are generally comprised of a stripe across the face of the indicator wall 54a,54b. Further, the indicator marks 56 extend substantially across the entire width $W_1$ of the indicator wall 54a,54b, while extending perpendicular to the length of the indicator walls 54a,54b. Multiple indicator marks 56 are placed on the indicator wall 54a,54b. In a preferred embodiment, there are five indicator marks 56 on each indicator wall 54a,54b. As part of the indicator marks 56 of the preferred embodiment, there exists a proximal indicator mark 74 adjacent the top of the indicator wall 54a,54b, and a distal indicator mark 76 adjacent the bottom of the indicator wall 54a,54b. When the proximal indicator mark 74 is displayed this indicates that the fuel tank 18 is full. Similarly, when the distal indicator mark 76 is displayed this indicates that the fuel tank 18 is nearly empty.

Figure 6:
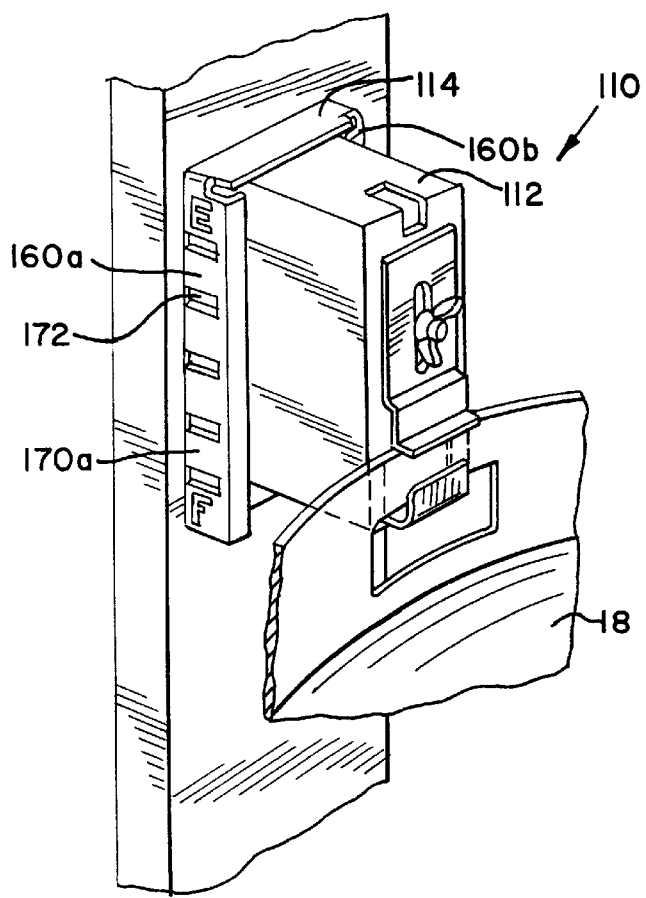
FIG. 6 is a fragmentary perspective view of another embodiment of the tank scale of the present invention; and, FIG. 7 is a bottom plan view of another embodiment of the tank scale of the present invention.

Additionally, each indicator mark 56 has a centerline 58 associated therewith. In the preferred embodiment the centerlines 58 of the indicator marks 56 are spaced an equal distance apart, approximately 0.75" apart. However, in an alternate embodiment, as shown in FIG. 6, the distances between the centerlines 58 of the indicator marks 56 are not equal. Unequal spacing allows for a different type of progressive type spacing. Further, while it is not necessary to have more than one indicator wall 54a,54b with indicator marks 56 thereon, it is of some benefit to have two indicator walls 54a,54b. Having two indicator walls 54a,54b allows for readouts on both sides of the tank scale 10. Accordingly, the tank scale 10 can be fixed to the barbecue grill on nearly any frame member, including the tank support panel, and orientated in nearly any direction, while still allowing for easy visibility of the fuel gauge readout for the user.

The first housing member 12 also has a cavity 36 formed by the rear wall 24, side walls 38, 40, and top and bottom walls 39,41 of the first housing member 12. As is explained in more detail below, the spring member 16 is generally located within the cavity 36 of the first housing member 12.

The Second Housing Member 14:

The second housing member 14 is shown in detail in FIGS. 5a–5c. As illustrated in FIGS. 5a–5c, the second housing member 14 generally includes first and second channels 60a,60b connected by or part of a plate member 62. The second housing member 14 additionally includes a stop 64, an outwardly extending mounting bracket 26, a locking bracket or slidable clamp element 27, and a spring-mounting tab 66. From a top-view, shown in FIGS. 3 and 5b, the second housing member 14 generally forms a variety of C-shaped members. First, each channel 60a,60b individually is generally C-shaped. Second, the combination of both the first channel 60a, the plate member 62 and the second channel 60b is generally C-shaped. As such, the second housing member 14 forms a moveable or slidable track. In the preferred embodiment the track formed by the overall C-shaped second housing member 14 is able to traverse or slide up and down on the rollers 48 of the first housing member 12.

In its entirety, the second housing member 14 is manufactured from sheet metal which is punched and bent up to form the final part. Through one such combination of punching and bending operations, the indicator bracket or plate member 62 and each of the channels 60a,60b are formed. The indicator bracket 62 is generally a flat rectangular element. At approximately the center of the indicator bracket 62 a threaded stud 30 extends radially through the indicator bracket in a direction opposite the channels 60a, 60b. The threaded stud 30 operates as a means for connecting the locking bracket 27 to the second housing member 14 for securing the fuel tank 18 thereto.

A respective one of the first and second channels 60a,60b is adjacent a different longitudinal side of the indicator bracket or plate member 62. Each of the channels 60a,60b adjacent the indicator bracket 62 are bent inward toward the center of the indicator bracket 62 such that they each form an inward facing "C." Accordingly, the first and second channels 60a,60b are mirror images of each other about a centerline of the indicator bracket 62. As stated above, the C-shaped channels 60a,60b form one portion of a track such that the second housing member 14 can traverse up and down with respect to the first housing member 12. As seen in FIG. 3, the interior width W of each channel is slightly greater than the diameter D of the rollers 48. Accordingly, the shape and dimensioning of each channel 60a,60b operates to partially encapsulate the rollers 48 of the first housing member 12. This allows the second housing member 14 to slidably engage the first housing member 12.

The outermost portion of each channel 60a,60b forms a gauge wall 70a,70b. Further, each gauge wall 70a,70b has a plurality of openings 72 therethrough. Each opening 72 is a cutout entirely through a portion of the respective gauge walls 70a,70b of the channels 60a,60b. The openings 72 extend substantially across the entire width W of the gauge wall 70a,70b. In the preferred embodiment, the openings 72 are generally the same shape and size as the indicator marks 56. Additionally, each opening 72 has a centerline 82 associated therewith. In the preferred embodiment the centerlines 82 of the openings 72 are spaced an equal distance apart, that being approximately 0.9375" apart ($^{15}/_{16}$"). However, in an alternate embodiment, as shown in FIG. 6, the distances between the centerlines 82 of the openings 72 are not equal. Further, similar to previous disclosure herein, while it is not necessary to have more than one gauge wall 70a,70b with openings 72, it is of some benefit to have two gauge walls 70a,70b having openings 72 to allow for readouts on both sides of the tank scale 10.

When the second housing member 14 is slidably engaged with the first housing member 12, the gauge walls 70a,70b partially overlie the respective indicator walls 54a,54b. In this position a portion of the indicator wall 54a,54b is exposed through the openings 72 in the gauge wall 70a, 70b. More specifically, the indicator marks 56 are visible through the openings 72. As the second housing member 14 traverses up and down due to the opposed forces of the weight of the fuel tank 18 and the resistive force of the spring member 16, the indicator marks 56 will be sequentially visible through different openings 72, thereby providing a readout of the amount of fuel left in the fuel tank 18.

Similar to the indicator walls 54a,54b, the gauge walls 70a,70b have a proximal opening 78 adjacent the top of the gauge wall 70a,70b, and a distal opening 80 adjacent the bottom of the gauge wall 70a,70b. As such, when the proximal indicator mark 74 is displayed through the proximal opening 78, this indicates that the fuel tank 18 is full. Similarly, when the distal indicator mark 76 is displayed through the distal opening 80, this indicates that the fuel tank 18 is nearly empty.

Through another combination of bending and punching operations, the outwardly extending mounting bracket 26 is formed out of the indicator bracket or plate member 62. The mounting bracket 26 is shaped like an outwardly and upwardly extending lip which extends away from the indicator bracket 62 in a direction opposite from the channels 60a,60b. As such, the mounting bracket 26 is located on the opposite side of the indicator bracket 62 as the both the channels 60a,60b and the first housing member 12. The shape of the mounting bracket 26 allows it to be able to receive and hold a standard fuel tank 18 by placing the mounting bracket 26 through the slot 28 in the lip of the fuel tank 18. Once the fuel tank 18 is positioned on the mounting bracket 26, the slidable clamp element 27 can be manipulated to lock the fuel tank 18 in place.

The locking bracket or slidable clamp element 27 is similarly formed from a piece of sheet metal and is approximately in the shape of an "L." The locking bracket 27 has a upper portion 84 and a transverse lower portion 86. The upper portion 84 has a slot 88 substantially the length of the upper portion 84. The transverse lower portion 86 extends from a bottom of the upper portion 84 such that the lower portion 86 is substantially perpendicular to the upper portion 84. The locking bracket 27 is fitted onto the second housing member 14 by having the threaded stud 30 placed through the slot 88 and secured with a wing nut 92. Once the fuel tank 18 is in place on the mounting bracket 26, the locking bracket 27 can be moved downward toward the mounting bracket 26 and tightened in place via the wing nut 92 to secure the fuel tank 18 with a tight pressure clamp. Conversely, when the fuel tank 18 is to be removed from the tank scale 10, the wing nut 92 can be loosened and the locking element 27 can be raised to allow from the fuel tank 18 to be lifted off the mounting bracket 26.

A stop 64 extends from the top of the indicator bracket or plate member 62. The stop 64 extends towards the channels 60a,60b at approximately 90° to the indicator bracket 62. When a full fuel tank 18 is secured to the tank scale 10, the stop 64 abuts the top wall 39 of the main body portion 32 of the first housing member 12. The stop 64 prevents the second housing member 14 from any further downward movement due to the weight of the fuel tank 18. When the stop 64 abuts the top wall 39 of the first housing member 12, the proximal indicator mark 74 is displayed through the proximal opening 78, indicating that the fuel tank 18 is substantially full of fuel.

A spring-mounting tab 66 extends from the bottom of the indicator bracket 62. The tab 66 similarly extends toward the side of the indicator bracket 62 having the channels 60a,60b. In the preferred embodiment the spring mounting tab 66 extends at an angle a to the indicator bracket 62, however, the tab 66 could acceptably extend at any angle to the indicator bracket, including 0°, 90° or 180°. A second end of the spring member 16 connects to the spring-mounting tab 66 to connect the first housing member 12 to the second housing member 14. When a fuel tank 18 which is nearly empty is attached to the tank scale 10, the resistive force of the spring member 16 raises the second housing member 14 upward such that the tab 66 is adjacent the lower shaft 46b (see FIG. 2). At the same time, a portion of the spring member 16 will abut the lower shaft 46b, thus preventing the second housing member 14 from being raised any further. In this position the distal indicator mark 76 will be displayed through the distal opening 80 indicating that the fuel tank 18 is nearly empty. This will alert the user to replace the empty fuel tank 18 with a full fuel tank 18.

Figure 7:
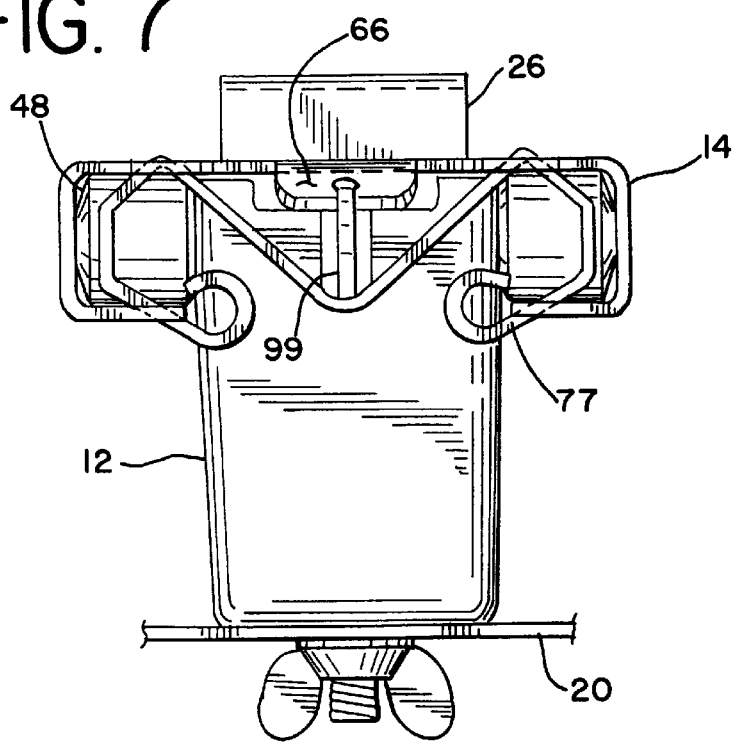

In another embodiment shown in FIG. 7, a clip 77 is installed in apertures 79 in the indicator bracket 62 and is secured thereto. The clip 77 operates as a safety stop to prevent the spring member 16 from raising the second housing member 14 further upward than is desired.

In the preferred embodiment of the tank scale there are five openings 72 in each gauge wall 70a,70b. Additionally, there are five indicator marks 56 on each indicator wall 54a,54b. Having five openings 72 allows for five different readings of the content of the fuel tank 18: one for full, one for empty, and three different openings 72 for different levels of partially full. The indicator marks 56 are arranged to be exposed through the openings 72 in a progressive fashion. The overall amount of travel of the second housing member 14 from the "full" indication point to the "empty" indication point is approximately 0.75" in the preferred embodiment. This includes the distance between the point where the stop 64 abuts the top wall 39 of the first housing member 12, to the point where the spring member 16 abuts the lower shaft 46b. Accordingly, for every ³⁄₁₆" (0.1875") of travel of the second housing member 14, a different indicator mark 56 will become sequentially visible through a different opening 72, thereby registering the amount of fuel left in the fuel tank 18.

The Spring Member 16:

As shown in FIGS. 1 and 2, the spring member 16 of the present invention operates to provide a resistive or spring load force in opposition to the weight of the fuel tank 18. As such, the spring member 16 opposes downward sliding movement of the second housing member 14 when the tank is full. The spring member 16 has a first end 98 and a second end 99. The first end 98 is connected to the spring member connecting means 42 of the first housing member 12. The second end 99 is connected to the spring-mounting tab 66 of the second housing member 14. In the preferred embodiment of the present invention, the spring member 16 is a tension spring having first and second ends 98,99. However, the spring member 16 could any type of elastic member having resistive characteristics, including a rubber band. The first and second ends 98,99 each have hook shaped ends, with the plane of each hook end 98,99 being at 90° to the other. When a full fuel tank 18 is secured to the tank scale 10, the opposed movement force or downward moving force due to the weight of the fuel tank 18 is approximately 35 pounds. With 35 pounds of force pulling the second housing member 14 downward, the spring resistance force is not great enough to overcome the downward force and the stop 64 of the second housing member 14 will rest on the top wall 39 of the first housing member 12, preventing the second housing member 14 from further downward movement. The proximal indicator mark 74 will be displayed through the proximal opening 78, indicating that the fuel tank 18 is full. As the weight of the fuel tank 18 decreases through use of the barbecue grill, the resistive force of the spring member 16 overtakes the downward or gravitational force of the weight of the fuel tank 18 and begins to slide the second housing member 14 upward. As the second housing member 14 slides upward with respect to the first housing member 12, different indicator marks 56 between the distal indicator mark 76 and the proximal indicator mark 74 will be sequentially visible through different openings 72. When the opposed movement force of the fuel tank (i.e., the weight of the fuel tank) is approximately 21 pounds, the spring resistance force will have moved the second housing member 14 such that the second end 99 of the spring member 16 abuts the lower shaft 46b, thus preventing the second housing member 14 from traversing any farther upward. At this point, the distal indicator mark 76 will be visible through the distal opening 80 indicating that the fuel tank 18 should be refilled or replaced. The spring member 16 characteristics are selected such that the tank scale 10 will give a fairly accurate indication of the amount of duel remaining within a standard-sized portable fuel tank 18 connected to the tank scale 10. The spring characteristics are preferably such that the tank scale 10 remains in the "full" position until about ⅔ of the gas within the tank 18 has been depleted. Thus, a more accurate indication of when the tank 18 approaches complete depletion may be realized.

Additional Embodiments:

An alternate embodiment is illustrated in FIG. 6. This embodiment displays a tank scale 110 have similar components to the previously described tank scale 10. Accordingly, like components will be described with like reference numerals. In this embodiment the second housing member 114 has two channels 160a,160b connected by a plate member. The second housing member 114 is C-shaped and the outermost portion of each channel 160a,160b forms a gauge wall 170a,170b having a plurality of openings 172 therethrough. Unlike the previous embodiment, in this embodiment the second housing member 114 is adapted to remain fixed in position by being secured to the frame of the barbecue grill.

The first housing member 112 includes a main body portion, two flaredout projections having indicator marks thereon, and two shafts with rollers. The first housing member 112 slidably engages the second housing member 114 and is adapted to be moveable relative to the second housing member 114. The first housing member 112 is also adapted to secure a fuel tank 18 thereto. A spring member connects the first housing member 112 to the second housing member 114, and provides a resistive force to oppose downward movement of the first housing member 112 due to the weight of the fuel tank 18. Indicator marks on the first housing member 112 are exposed through the openings 172 of the second housing member 114 to provide a readout of the approximate level of fuel remaining in the fuel tank 18.

It is also contemplated that the second housing member 114 may be comprised of a portion of the grill cart or frame. For example, the barbecue grill cart or frame may include openings 172, thereby eliminating the need for a separate second housing member. As such, the indicating marks of the first housing member 112 would be positioned within the grill cart or frame to align with the openings 172. Therefore, for the purpose of the present disclosure, the housing member having openings may be comprised of a portion of the grill frame 20, or some other portion of the barbecue grill cart (not shown).

The distance between the centerlines of the indicator marks is not equal. Increased or decreased spacing (i.e., uneven spacing) of the distance between the centerlines of either the indicator marks or the openings 172, or both, can provide for progressive and sequential displaying of the indicator marks through the openings 172. In such a fashion, a different indicator mark will be visible through a different opening 172 as the weight of the fuel tank 18 changes, thereby indicating the level of fuel remaining in the fuel tank 18.

The embodiments shown in FIGS. 1 and 6 display a "F" for "full" and an "E" for "empty." FIG. 5b, however, displays another means for the readout for indicating the amount of fuel remaining the in the fuel tank. Specifically, FIG. 5b displays two-dimensional replicas of full, empty, and varying levels of partially full fuel tanks adjacent the indicator marks. In the preferred embodiment, the fuel tanks as illustrated in FIG. 5b are shown in distinguishing colors adjacent the indicator marks to indicate the amount of fuel remaining in the fuel tank. The use of two-dimensional fuel tanks to indicate the amount of fuel remaining in the tank provides for an international tank scale readout.

While the specific embodiments have been illustrated and described, numerous modifications come to mind without significantly departing from the spirit of the invention, and the scope of protection is only limited by the scope of the accompanying Claims.

What is claimed is:

1. An apparatus for indicating the amount of fuel in a fuel tank for a barbecue grill, the fuel tank having a weight which provides a downward force, the apparatus comprising:
   a first scale member having indicator marks on an indicator wall thereof;
   a second scale member slidably engaging the first scale member, the second scale member having a gauge wall wherein the gauge wall at least partially overlies the indicator wall of the first scale member, and wherein the gauge wall has at least one opening; and,
   a spring member connected to the first and second scale members, the spring member providing a resistive force adapted to oppose the downward force of the fuel tank.

2. The apparatus of claim 1, wherein said at least one opening in the gauge wall of the second scale member exposes an underlying area of the first scale member indicator wall.

3. The apparatus of claim 2, wherein one of either the first or the second scale member is adapted to remain fixed in position, and the other of either the first or second scale member is movable.

4. The apparatus of claim 3, wherein the scale member adapted to remain fixed in position is secured to a frame of the barbecue grill.

5. The apparatus of claim 3, wherein the movable scale member is adapted to remain fixed in position is adapted to removably secure the fuel tank thereto.

6. The apparatus of claim 3, wherein the gauge wall has a plurality of openings, and wherein the indicator marks are arranged to be exposed through different openings in the gauge wall in progression as the first scale member moves relative to the second scale member.

7. The apparatus of claim 6, wherein each indicator mark has a centerline, the centerline of each indicator mark being spaced an equal distance apart.

8. The apparatus of claim 7, wherein each opening has a centerline, the centerline of each opening being spaced an equal distance apart.

9. The apparatus of claim 8, wherein the distance between the centerlines of the indicator marks and the distance between the centerlines of the openings is not equal.

10. The apparatus of claim 8, wherein the distance between the centerlines of the openings is greater than the distance between the centerlines of the indicator marks.

11. The apparatus of claim 6, wherein the indicator marks are unevenly spaced along a length of the indicator wall, and the openings of the gauge wall are generally evenly spaced.

12. The apparatus of claim 6, wherein the indicator marks are generally evenly spaced along the length of the indicator wall, and the openings of the gauge wall are generally unevenly spaced.

13. The apparatus of claim 3 further comprising a first shaft, a second shaft, and a plurality of rollers, the first and second shafts being connected to the scale member adapted to remain fixed in position, the first and second shafts each having a distal end and a proximal end, wherein at least one of the plurality of rollers is attached to each of the distal and proximal ends of the first and second shafts.

14. The apparatus of claim 3 further comprising a first shaft, a second shaft, and a plurality of rollers, the first and second shafts connected to the moveable scale member, the first and second shafts each having a distal end and a proximal end, wherein at least one of the plurality of rollers is attached to each of the distal and proximal ends of the first and second shafts.

15. The apparatus of claim 3 further comprising a stop adapted to maintain the movable scale member in a fixed downwardmost position when a full fuel tank is secured thereto.

16. The apparatus of claim 3, wherein when a full fuel tank is secured to the movable scale member, a proximal indicator mark is exposed through an opening indicating that the fuel tank is full.

17. The apparatus of claim 16, wherein when an empty fuel tank is secured to the movable scale member, a distal indicator mark is exposed through an opening indicating that the fuel tank is empty.

18. The apparatus of claim 17, wherein the first and second scale members comprise a housing of the apparatus.

19. An apparatus for indicating the amount of fuel in a fuel tank for a barbecue grill, comprising:
   (a) a first housing member having an indicator wall with indicator marks thereon;
   (b) a second housing member slidably engaged with the first housing member, the second housing member having a gauge wall at least partially covering the indicator wall of the first housing member, the gauge wall having at least one opening such that the at least one opening in the gauge wall exposes an underlying area of the indicator wall of the first housing member, wherein one of either the first or the second housing member is adapted to remain in a fixed position, the other of either the first or the second housing member being slidably movable relative to the housing member that is adapted to remain in a fixed position, and wherein the housing member which is slidably movable relative to the other housing member is adapted to removably secure the fuel tank thereto, the fuel tank having a weight which provides an opposed movement force; and,
   (c) a spring member connected to the first housing member and the second housing member, the spring member providing a force in resistance to the opposed movement force of the fuel tank.

20. The apparatus of claim 19, wherein the gauge wall has a plurality of openings, and wherein the indicator marks are arranged to be exposed through different openings in the gauge wall in progression as the housing member which is movable moves relative to the housing member which is fixed in position.

21. The apparatus of claim 20, wherein each indicator mark has a centerline, the centerline of each indicator mark being spaced a distance apart, and wherein each opening has a centerline, the centerline of each opening being spaced a distance apart.

22. The apparatus of claim 21, wherein the distance between the centerlines of the indicator marks and the distance between the centerlines of the openings is not equal.

23. The apparatus of claim 20, wherein the indicator marks along a length of the indicator wall are unevenly spaced and the openings along a length of the gauge wall are evenly spaced, wherein said spacing of the indicator marks and the openings are adapted to provide progressive alignment of indicator marks with the openings as the housing member which is movable moves relative to the other housing member.

24. The apparatus of claim 20, wherein a first indicator mark is exposed through an opening when the opposed movement force is approximately equal to 35 pounds.

25. The apparatus of claim 20, wherein a first indicator mark is exposed through an opening when the opposed movement force is approximately equal to a fuel tank for a barbecue grill combined with a full level of fuel.

26. The apparatus of claim 20, wherein a distal indicator mark is exposed through an opening when the opposed movement force is approximately equal to 21 pounds.

27. The apparatus of claim 20, wherein a distal indicator mark is exposed through an opening when the opposed movement force is approximately equal to a fuel tank for a barbecue grill which is empty.

28. An apparatus for indicating the amount of fuel in a fuel tank for a barbecue grill, comprising:
   a first housing member having an indicator wall with indicator marks thereon;
   a second housing member slidably engaged with the first housing member, the second housing member having a first wall, a second wall substantially parallel to the first wall, and a third wall adjacent the first wall and the second wall, such that the first, second and third wall form a C-shape, the third wall at least partially covering the indicator wall of the first housing member and the third wall having a plurality of openings such that at least one opening exposes an underlying area of the indicator wall of the first housing member, wherein the first housing member is adapted to remain in a fixed position, wherein the second housing member is slidably movable relative to the first housing member, and wherein the second housing member is adapted to removably secure the fuel tank thereto, the fuel tank having a weight which provides an opposed movement force;
   a spring connected to the first housing member and the second housing member, the spring member providing a spring load force in resistance to the opposed movement force of the fuel tank;
   a first shaft connected to the first housing member;
   a second shaft connected to the first housing member; and,
   a plurality of rollers, one of the plurality of rollers attached to an end of the first shaft and an end of the second shaft, wherein the first, second and third walls of the second housing member partially encapsulate the rollers.

29. The apparatus of claim 28, wherein the indicator marks are arranged to be exposed through different openings in the third wall in progression as the second housing member moves relative to the first housing member.

30. The apparatus of claim 28, wherein each indicator mark has a centerline, the centerline of each indicator mark being spaced a distance apart, and wherein each opening has a centerline, the centerline of each opening being spaced a distance apart.

31. The apparatus of claim 30, wherein the distance between the centerlines of the indicator marks and the distance between the centerlines of the openings is not equal.

32. The apparatus of claim 28, wherein the indicator marks along a length of the indicator wall or the openings along a length of the third wall are unevenly spaced, the other of the indicator marks along a length of the indicator wall or the openings along a length of the third wall being evenly spaced.

33. The apparatus of claim 29 wherein a first indicator mark is exposed through an opening when the opposed movement force is approximately equal to 35 pounds.

34. The apparatus of claim 29 wherein a distal indicator mark is exposed through an opening when the opposed movement force is approximately equal to less than 20 pounds.

35. The apparatus of claim 28 wherein the first housing member is adapted to attach to a tank support panel of a barbecue grill.

36. The apparatus of claim 28 wherein the second housing member further has a stop adjacent a top of the first housing member, the stop preventing the second housing member from detaching from the first housing member when a fuel tank which is full of fuel is connected to the second housing member.

* * * * *